Oct. 27, 1970  R. J. LATHAM  3,535,909
METHOD OF MAKING STAINLESS STEEL AND LIKE TUBES
AND FITTINGS WITH BRANCHES
Filed Feb. 6, 1968

INVENTOR
ROLAND J. LATHAM
By Emery L. Groff Jr. Atty

United States Patent Office 3,535,909
Patented Oct. 27, 1970

3,535,909
METHOD OF MAKING STAINLESS STEEL AND
LIKE TUBES AND FITTINGS WITH BRANCHES
Roland James Latham, 10 Waite Davies Road,
Lee, London, SE. 12, England
Filed Feb. 6, 1968, Ser. No. 703,469
Int. Cl. B21k 21/16
U.S. Cl. 72—367                              3 Claims

ABSTRACT OF THE DISCLOSURE

A method of making a stainless steel T or other branched tube which consists in first deforming a tube of circular cross section into one of oval cross section, and then deforming a smaller diameter side of the tube from each end of the latter towards the centre thereof and from which the branch is to extend by applying shaping dies thereto in a succession of passes so as to reduce the ends of the tube to a required diameter and gradually gather the metal between said reduced diameter ends and form it into a circular neck or branch.

Cross references to related applications

United Kingdom application No. 51,973/66, dated Nov. 21, 1966.

Background of invention

This invention relates to a method of and means for producing tubes and like fittings (hereinafter referred to simply as tubes) of stainless steel, carbon steel and of other metals wherein the tubes are formed with branched outlets to form them into T's or crosses.

Heretofore the manufacture of such tubes has been difficult and expensive, particularly so far as stainless steel is concerned because such a tube has to be formed from strip material which is formed into a tube, seam welded longitudinally then formed with a hole or opening, and a neck or branch then welded to the edge of the opening to form the T.

In the case of carbon steel it is usual to form a tube of heavier gauge and larger diameter and then deform it by pressing it into an oval shape in cross section. A hole is then formed in the smaller radiused part. The tube is then heated on the half having the hole which is to be formed with the neck or branch and the latter is formed by a pair of dies and approximately half the length of the neck is formed. The half of the pipe having the branch is reheated and is acted upon by master dies which impart the final shape to the neck and the hole in the outer end of the neck is opened out to its true diameter by pulling a shaping ball therethrough. Considerable machining then has to be carried out to remove surplus material.

The object of the present invention is to provide for the manufacture of stainless steel and carbon steel tubes having branches e.g. T's and crosses, which can be produced in a more simple and much less expensive manner as compared with the known methods above referred to.

Summary of the invention

According to the present invention a method of manufacturing branched tubes or pipes of stainless steel consists firstly in deforming a tube from a circular section into an oval section having its minor radius substantially equal to the radius of the required tube to be formed, then tapering the side of the pipe to be formed with a branch so that a taper extends from each end of the pipe to the centre of said side so that the size of the pipe at the ends is reduced so as to form a lead for shaping dies which are then engaged over each end of the pipe and moved towards the centre thereof so as to deform the upper part of the tube in a succession of passes, the dies being so shaped that the ends of the pipe at either side of the branch are gradually reduced to the required diameter of the pipe and simultaneously the branch is progressively formed by gathering the metal between the reduced diameter ends and forming it into a circular neck.

The tube from which a T is fashioned in accordance with this invention may be either a seamless or a seamed tube, and in this respect it is to be pointed out that with well known forging methods the use of a seamed tube is not practicable because the tube tends to fracture, this disadvantage being avoided by the method of this invention.

An important advantage of the method of the invention is that the gradual formation of the neck enables a gauge of tube to be used equal to that of the gauge required for the finished tube thereby reducing final machining and waste to a minimum. With known methods a pipe of much heavier gauge has to be used to prevent the tube collapsing during the formation of the neck.

Description of the preferred embodiments

Figure 1:
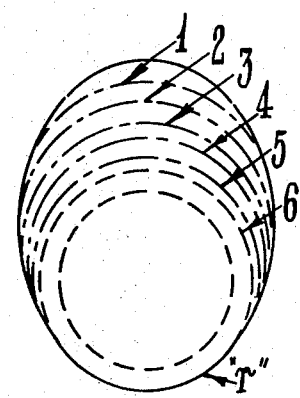
FIG. 1 is a view showing the cross-section to which a tube is deformed at the initial stage.

Referring to the drawings and firstly to FIG. 1, the basic tube from which the T is to be fashion is deformed from a circular cross-section to a substantially oval cross-section as shown and the minor radius "r" is that of the finished tube.

Figure 2:
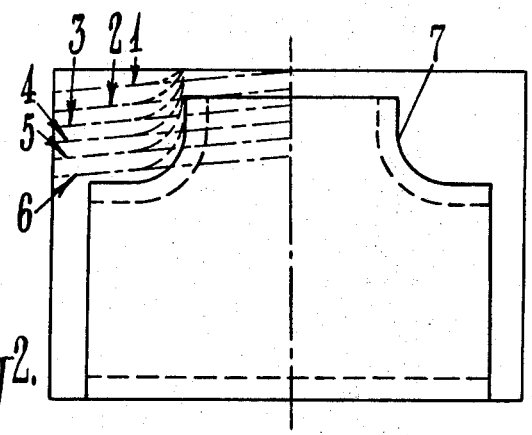
FIG. 2 is a side elevation indicating how the neck is gradually formed by a succession of passes.

Referring next to FIG. 2, the side of the tube to be formed with a neck is tapered at each side of the centre of the length of the tube by a pair of tapering dies to form tapers 1 to give leads for the pair of shaping dies 8 (FIG. 3) which are engaged over each end of the tube.

As shown in both FIGS. 1 and 2, a number of passes e.g. five passes 2, 3, 4, 5 and 6 are made at each end of the tube by the shaping dies 8 and during this succession of passes the ends of the tube are reduced to the required radius and at the same time the neck 7 is gradually formed, the tube being normalised between each step or stage. Although the passes have only been indicated at the left hand side of FIG. 2 it will of course be appreciated that these passes are simultaneously made at the other side of the T. The change in shape is shown by FIGS. 5 to 9.

Figure 3:
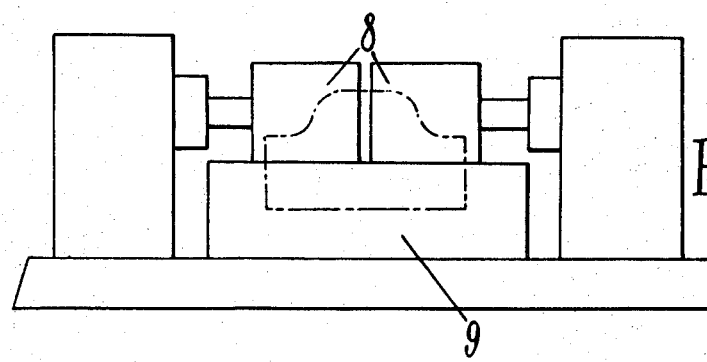
FIG. 3 is a view showing how the T is produced by a press.
Figure 4:
FIGS. 4–9 are side views showing how the neck is gradually formed.
Figure 5:
Figure 6:
Figure 7:
Figure 8:
Figure 9:

At each stage, the bottom die 9 shown in FIG. 3 and which is a simple trough-like die is replaced by one of lesser depth and during each step the lower edges of the top dies 8 slide over the top edges of the lower die.

Finally a pair of finishing dies are used one over the top and one over the bottom for sizing.

Figure 10:
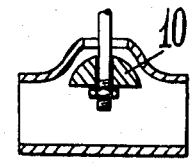
FIG. 10 illustrates how the bore in the neck is opened out.

A small hole is then made in the material remaining over the mouth of the branch and a plug 10 (FIG. 10) is pulled through the neck to open out the mouth of the neck to size.

Figure 11:
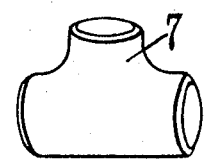
FIG. 11 illustrates the finished T.

The T is then trimmed and cut to length as shown in FIG. 11.

Although the embodiment described above concerns

T's, it will be appreciated that the same method may quite easily be employed for the production of crosses.

I claim:

1. A method of manufacturing branched tubes or pipes of stainless steel which consist firstly in cold deforming a tube from a circular section into an oval section having its minor radius substantially equal to the radius of the required tube to be formed, then tapering the side of the pipe to be formed with a branch so that a taper extends from each end of the pipe to the centre of said side so that the size of the pipe at the ends is reduced so as to form a lead for shaping dies which are then engaged over each end of the pipe and moved towards the centre thereof so as to cold deform the upper part of the tube in a succession of passes, the dies being so shaped that the ends of the pipe at either side of the branch are gradually reduced to the required diameter of the pipe and simultaneously the branch is progressively formed by gathering the metal between the reduced diameter ends and forming it into a circular neck.

2. The method claimed in claim 1, wherein the tube is normalised between each of said passes.

3. The method claimed in claim 1, wherein after said passes have been made a pair of finishing dies are used one over the top and one over the bottom of the T or the like for sizing.

References Cited

UNITED STATES PATENTS

| 653,279 | 7/1900 | Barthels | 29—157 |
| 2,240,319 | 4/1941 | Taylor | 29—157 |

FOREIGN PATENTS

| 7,472 | 4/1901 | Great Britain. |

LOWELL A. LARSON, Primary Examiner

U.S. Cl. X.R.

29—157